United States Patent [19]

Wallberg

[11] 4,401,011

[45] Aug. 30, 1983

[54] METHOD TO ADJUST AND/OR INDICATE A LIQUID OR GASEOUS PRESSURE, AND A DEVICE FOR UTILIZATION OF THE METHOD

[76] Inventor: Kurt-Ake Wallberg, Tulpanvägen 1, Vallentuna, Sweden, S-186 00

[21] Appl. No.: 154,034

[22] Filed: May 28, 1980

[51] Int. Cl.³ .................... F15B 15/22; F15B 15/17; F01B 9/00

[52] U.S. Cl. .................... 91/400; 91/402; 91/417 R; 92/129; 92/138; 92/130 R; 251/58

[58] Field of Search ............... 137/505.47, 505.46; 92/130 R, 138, 129; 91/417 R, 416, 400, 402

[56] References Cited

U.S. PATENT DOCUMENTS

| | | | |
|---|---|---|---|
| 140,156 | 6/1873 | Olsson | 137/505.46 |
| 474,064 | 5/1892 | Piccard | 91/417 R |
| 536,255 | 3/1895 | Baldwin | 92/130 R |
| 537,273 | 4/1895 | Carlmon | 91/417 R |
| 728,651 | 5/1903 | Albright | 92/130 R |
| 1,585,529 | 5/1920 | Boving | 91/417 R |

Primary Examiner—Paul E. Maslousky
Attorney, Agent, or Firm—Holman & Stern

[57] ABSTRACT

A method for adjustment and/or indication of a liquid or gaseous pressure, and advice for utilization of the method, including the use of a piston member (7, 7'), movably arranged in a surrounding housing (1), said member having two towards each other acting piston areas with different area, said piston areas being made subject to a pressure from the liquid or gaseous medium, a mechanical load also being supplied to the smaller piston area, whereby the piston surfaces only perform a common movement when the media pressure exceeds a predetermined limiting value, which limiting value comprises of resulting force for the force developed by the smaller piston area under influence of supplied media pressure and added mechanical force, said movement, when predetermined limiting value is exceeded, being arranged to influence a flow restricting valve member and/or indicate the pressure of supplied media.

11 Claims, 6 Drawing Figures

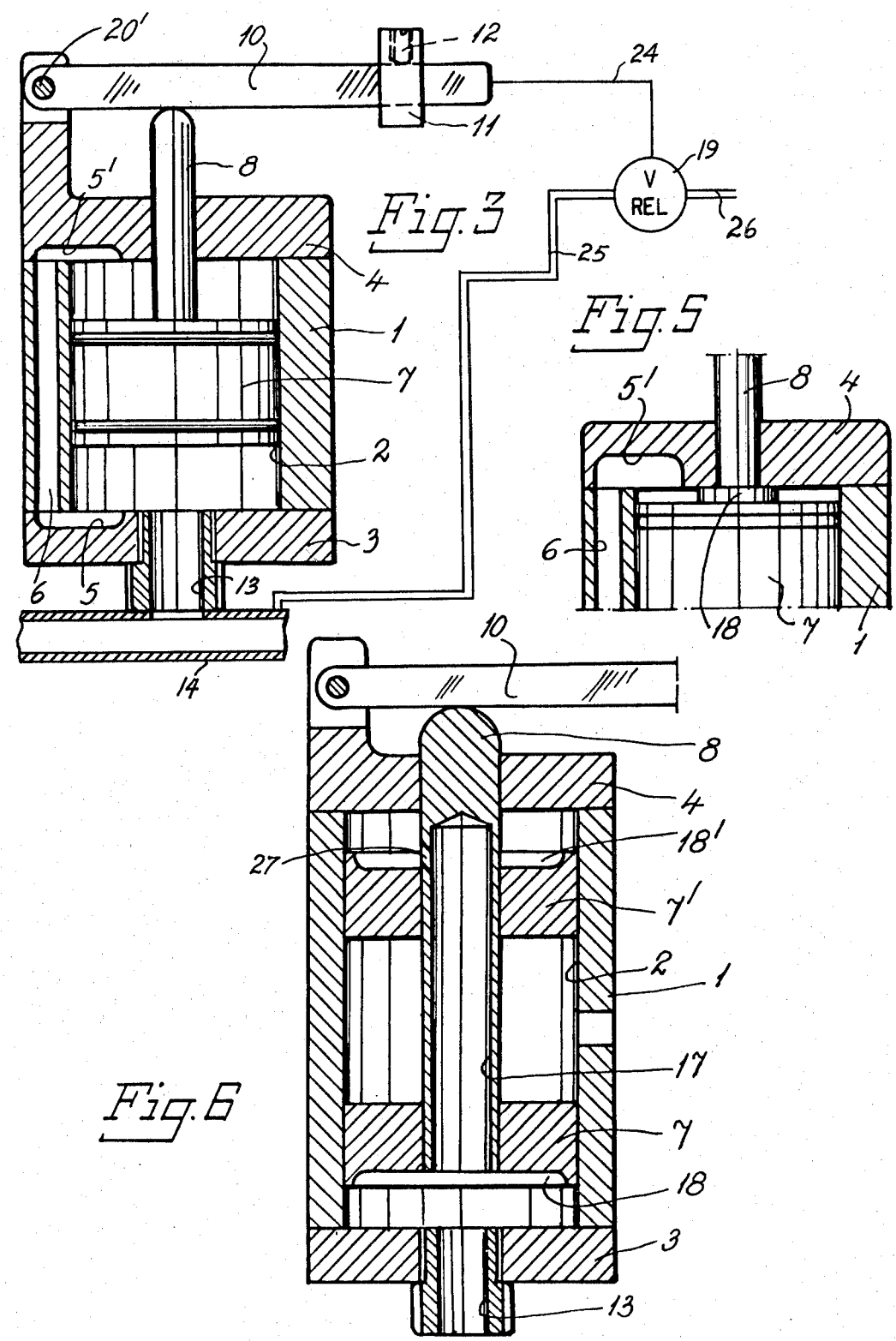

METHOD TO ADJUST AND/OR INDICATE A LIQUID OR GASEOUS PRESSURE, AND A DEVICE FOR UTILIZATION OF THE METHOD

BACKGROUND OF THE INVENTION

1. Field of the Invention

The present invention relates to a method for adjustment and/or indication of a liquid or gaseous pressure, and a device for utilization of the method.

2. Description of the Prior Art

In installations including parts such as pipe systems or similar apparatus for liquid or gas under pressure, it is previously known to use different types of valve members for pressure adjustment, such as safety valves, overflow valves and similar devices, and also to use different types of indicating members, e.g. pressure gauges, intended to show existing pressures.

With regard to previously known types of valve members, these usually include a piston member, having a surface communicating with the medium under surveillance, said piston member usually being arranged in contact with a valve seat or similar element due to pressure from a co-acting spring member. With regard to safety valves, arranged in a water pipe system, e.g. in connection to incoming pipes for a hot water boiler, the valve member is designed and arranged in such a way, that it will open at a pipe pressure exceeding a predetermined limiting value, thus eliminating damage caused by intermittent and large pressure increases in incoming pipe system. Said type of valve usually includes a circular valve member having a relatively large diameter, arranged in contact with a valve seat under the influence of a spring, said valve seat communicating with the incoming pipe system. When the pressure is increased above a predetermined value, said valve member is forced in a direction away from the valve seat, whereby the water can flow out from a discharge channel in a surrounding valve housing. In order to faciliate control of the valve, a manually operable member is arranged outside the valve housing, which by application of a considerable manual force is arranged to move the valve member in a direction away from the contact position against the valve seat. This makes it possible to check that the valve member can perform the intended opening movement.

Previously known types of overflow valves normally include a piston or a ball, which is spring loaded in contact with a valve seat. The tension of the spring is normally adjustable, e.g. by means of an adjustment screw, whereby desired opening pressure can be preadjusted. When the piston, or the ball, is moved from the contact position with the valve seat when preset pressure is exceeded, the medium comunicating with the valve seat is transferred to a suitable point in the system by means of an overflow channel.

With regard to previously known types of pressure indicating members, these usually include a spring loaded piston, the movement of which is a measure of existing pressure, or a bent tubular part, closed at a free end portion, and with the other end portion communicating with the medium under pressure to be indicated. The bent tubular part is usually attached to an indicating member by means of a lever system or similar mechanism, and the inclination to take up a linear configuration when exposed to an internal pressure is a movement which can be transformed to a measured value for existing pressure.

A common feature for previously known types of adjusting or indicating members used for liquid and gas under pressure is the use of spring loaded members, or members having spring-acting properties, in order to determine pressure limits and/or existing pressure. It is a known fact, that pressure springs, tension springs and helicoil springs extending in mainly one plane, as well as other types of springs, due to the properties of the material can not achieve the theoretically desired property, and that spring movement does not result in an altered spring load. With regard to pressure springs, the spring load is increased when the spring is compressed, if the spring has similar cross-sectional area along its entire length. By continuosly changing the relationship between cross-section/length, a certain compensation can be achieved, but the spring will be extremely costly to manufacture and calculate. Due to imposed stresses, caused by changes in temperatures and spring movements, the original properties of the spring are also altered. With regard to all types of springs, there is also an obvious risk of breakage, caused by variations in temperature and thereby changes in material properties, as well as other imposed stresses. With regard to pressure indicating members, such as pressure gauges, it is also difficult to achieve a member which faciliates a linear display of existing gaseous or liquid pressure, e.g. by the movement of a pointer along a scale. The sensitivity for temperature changes is also high for this type of instrument, i.e. changes in temperature near the instrument influence the spring members, which causes faulty indications. Calibration is also often necessary with certain intervals of time, in order to compensate for indication faults caused by changes in spring acting members, due to previously mentioned imposed stresses and ageing phenomena.

BRIEF SUMMARY OF THE INVENTION

The object of the present invention is to disclose a method, and a device for utilization of the method, which faciliates pressure regulation for a gaseous or liquid medium, and also indication of existing gaseous or liquid pressure. The method, and device, can be used alternatively as a combination for adjustment/indication, or only adjustment, as well as only indication. The method according to the present invention faciliates adjustment and/or indication of gaseous or liquid pressure completely without the use of a spring acting member, whereby all previously mentioned disadvantages with spring acting members are eliminated. When using the method to manufacture a safety valve of previously known type, it is also possible to obtain a safety valve completely without spring acting members, which has a large flow-through capacity when a predetermined pressure is exceeded, extremely simple calibration of predetermined pressure (previously a time-consuming operation), and an extremely high safety against faults. Manual discharge can also be achieved by application of a minimal manual pressure, whereas previously known types required such a large manual force, that only persons with considerable strength have been able to perform this discharge control, which should be performed at certain intervals of time.

When using the method of the invention for pressure indicating purposes, a completely linear result is obtained with regard to existing pressure, and no further calibration is required, since changes caused by stresses, variations in temperature or similar causes, do not exist. Also from a manufacturing point of view, many advantages are gained, partly due to the simple design, partly due to the fact that it can be adjusted for various pressure ranges in a simple manner, whereby one type can be used for pressure indication within a number of different pressure ranges. The possibility to design a pressure indicating instrument in such a way, that the user can alter the indicating range, is also offered.

Major characteristic features of the method according to the present invention are disclosed in the following main claim, and further characteristic features, as well as features of a device for utilization of the method, are disclosed in the subclaims.

In order to simplify understanding of the method according to the present invention, as well as for the device for utilization of the method, the method is more fully described below with reference to the accompanying drawings, which show a number of basic embodiments of devices for utilization of the method according to the present invention.

BRIEF DESCRIPTION OF THE DRAWINGS

FIG. 3 is a cross-sectional view of a second embodiment for utilization of the method according to the present invention.

FIG. 5 is a cross-sectional view of a second embodiment of a contact member.

FIG. 6 is a cross-sectional view of a third embodiment of a device for utilization of the method according to the present invention.

DETAILED DESCRIPTION

The present invention is based on the fact, that two piston surfaces or piston members acting towards each other, which have different areas, and which are exposed to the same gaseous or liquid pressure, result in two opposed forces, said forces being related to the piston surface areas exposed to the gaseous or liquid pressure. By arranging the pressure acting piston surfaces, or pistons, with a predetermined and different area relationship, a resulting difference in force is achieved, proportional to the difference between the areas. This principle can be exemplified by two double acting pneumatic or hydraulic cylinder and piston devices, having different piston areas, joined to each other with the piston rods, with the return channels (the inlet/outlet adjacent to the piston rods) communicating with the surrounding atmosphere, the cylinder channels at the opposed end portions of the cylinders being connected to the same pressure source. If the piston area relationship between the cylinders for example is 1/0,9. A resulting force is obtained, acting in a direction from the larger cylinder towards the smaller, which is 10% of the total force developed by the other cylinder, i.e. 90% of the force is counteracted by the force developed by the smaller cylinder. According to this example, the larger piston area $A_1$ can be referred to as 10 cm$^2$, the smaller $A_2$ as 9 cm$^2$ and the applied pressure as 4 kp/cm$^2$. This would result in a theoretical force $P_1$ of 40 kp for the larger cylinder, and the smaller cylinder would develop an opposed force in the region of 36 kp ($P_2$). Accordingly, the resulting force, $P_{res}$ would be 4 kp.

If the pressure is increased to 5 kp/cm$^2$, $P_1$ $P_2$ would remain proportionally equal, i.e. $P_1=50$ kp, and $P_2=45$ kp, with $P_{res}=5$ kp. With a further increase of the pressure to 6 kp/cm$^2$, the following result would be achieved: $P_1=60$ kp, $P_2=54$ kp, and $P_{res}=6$ kp. In this example $P_{res}$ is thus numerically equivalent to the supplied pressure.

By using other piston areas, e.g. $A_1=2$ cm$^2$, and $A_2=1.8$ cm$^2$, $P_{res}$ would result as follows with the above stated supplied pressures: 0.8–1.0 and 1.2 kp, i.e. every increase in pressure of 1 kp/cm$^2$ results in a change of 0.2 kp for $P_{res}$. The area difference $A_1/A_2$ can obviously be varied at will, in order to achieve the desired resulting difference in force.

Figure 1:
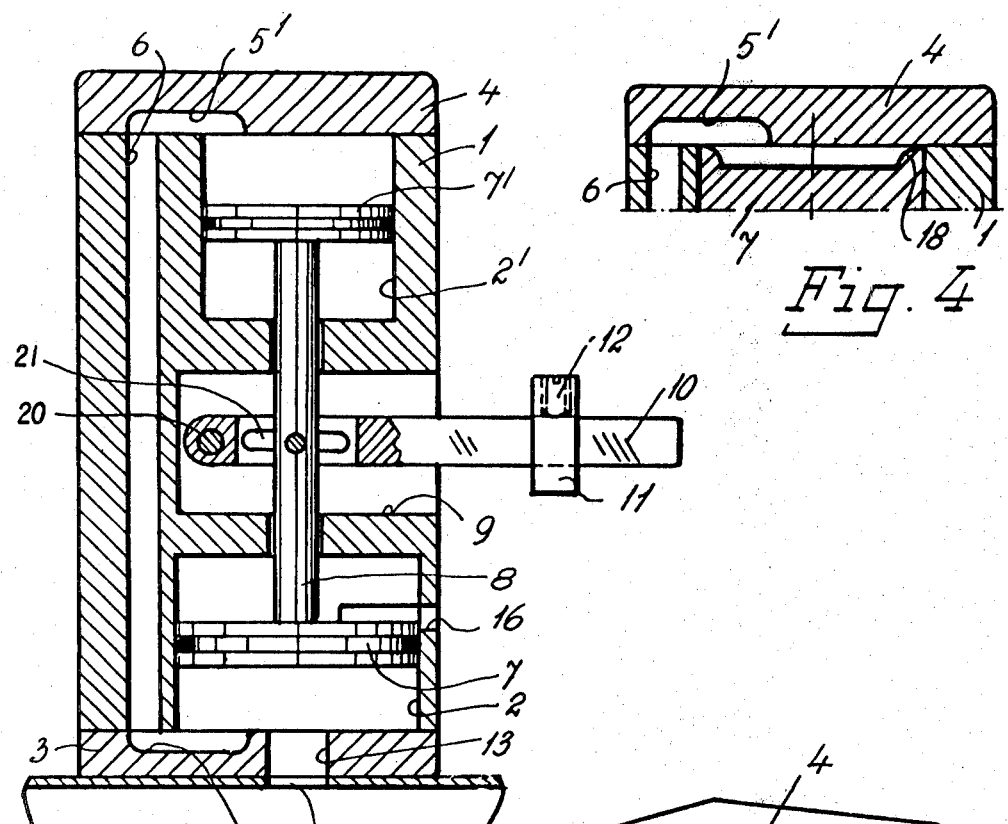
FIG. 1 is a cross-sectional view of a first basic embodiment of a device for utilization of the method according to the present invention.
Figure 2:
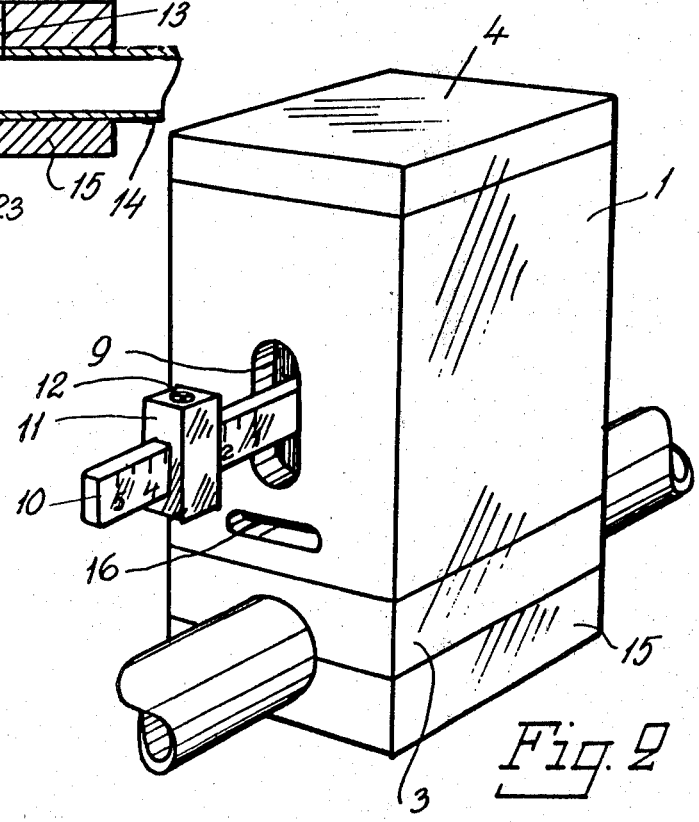
FIG. 2 is a perspective view of the embodiment shown in FIG. 1, attached to a tubular pipe, which tubular pipe is intended to transport a gaseous or liquid medium under pressure.

With reference to the embodiment shown in FIGS. 1 and 2, the above fact is used in the design of a simple safety or overflow valve. Said embodiment includes a housing 1, having two cylinders 2, 2'' extending towards each other from the end portions. The free end portions of the cylinders 2, 2'' are restricted by two end pieces, 3 and 4 respectively, attached to the housing 1, said end pieces 3, 4 having a groove 5, 5' respectively extending from each cylinder 2, 2', said grooves 5, 5' arranged to communicate with each other by means of a channel 6 in the housing. The cylinders 2, 2' have different cross-sectional areas, and a piston member 7, 7' is moveably arranged in each cylinder, internally connected by means of a piston rod 8. Said piston rod 8 extends through a recess 9 in the housing 1, arranged intermediately between the cylinders 2, 2'. A lever 10 is arranged in said recess 9, pivotably attached at 20 to the housing 1 adjacent to the end portion of the lever 10, and slidingly interengaging slot 21 and pin 22 members are also provided on lever 10 and piston rod 8 respectively, said members transforming a linear movement of the piston rod 8 in relation to rotational movement of the housing 1 to the lever 10 about pivot 20. The lever 10 protrudes from the housing 1, having a sliding counterweight 11 arranged at the free and outwardly directed portion, which can be moved to desired positions in relation to the longitudinal direction of the lever 10. Furthermore, the counterweight 11 is also arranged with a locking member 12, e.g. a locking screw, whereby the counterweight 11 can be fixed in desired position to the lever 10.

As previously mentioned, the cylinders 2, 2' are arranged with different cross-sectional areas, and with regard to the present embodiment, the larger cylinder area is located adjacent to an end piece 3, which is arranged with an inlet channel 13. Said inlet channel 13 is arranged to communicate with a pipe 14, in which a gaseous or liquid medium under pressure is assumed to be existing. In the present embodiment, the end piece 3 adjacent to the pipe 14 is arranged with a groove partly surrounding the pipe 14, having a mainly semi-circular cross-section, and a second member 15, having a correspondingly arranged groove, is arranged attachable to the end piece 3, thus embracing and holding the pipe 14 against the housing 1. As shown, a peripheral through hole 23 is arranged in the pipe 14 adjacent to the inlet channel 13 in the end piece 3, thus establishing the aforementioned flow communication. The hole 23 in the wall of the pipe 14 can either be made before attachment, or alternatively, the device can be arranged with a means, which in a previously known way is arranged to establish flow communication by removal of a peripheral wall portion from the pipe (not shown).

The medium existing in the pipe 14 flows through the inlet channel 13 into the cylinder 2 and also through the grooves 5, 5' and the channel 6 to the cylinder 2'. The surfaces of the piston means 7, 7' directed away from each other are thus made subject to a similar pressure per area unit, but the difference in piston area results in the development of a force ($P_{res}$), which moves the piston rod 8 in the direction away from the pipe 14. Against said force acts the force resulting from the counterweight 11, transferred to the piston rod 8 by means of the lever 10. By pre-adjustment of the counterweight 11 into a suitable position in relation to the attachment point for the lever 10 to the housing 1, a pressure limiting value can thus be set, which limiting value must be exceeded, before the piston rod 8 can move in the direction away from the pipe 14. When said limiting value has been exceeded by the pressure of the medium in the pipe 14, the piston rod 8 and the piston members 7, 7' are moved in relation to the surrounding housing 1. If said limiting value at a later stage is not reached, the piston rod 8 and the piston members 7, 7' return to the original position.

It should be mentioned, that the space existing in each cylinder 2, 2' between the piston members 7, 7' are arranged to communicate with the recess 9, and thus also with the surrounding atmosphere, whereby an air cushion can not be formed behind the piston members 7, 7', which air cushion otherwise would prevent the movement of the piston members 7, 7', in the cylinders 2, 2'.

The cylinder 2 adjacent to the pipe 14 is as shown arranged with a hole 16 through the housing 1, which at the inside surface of the cylinder 2 is transformed into a groove, partly surrounding the piston member 7. Should the pre-set and predetermined limiting pressure be exceeded, said groove and hole 16 is opened, whereby the medium supplied from the pipe 14 to the cylinder 2 can flow out through the hole 16, and when necessary reduction of the pressure has been performed, the piston member 7 closes off the communication with the hole 16. The described embodiment can thus serve as a safety or overflow valve, and the hole 16 can obviously be arranged communicating with a return pipe or similar relief means.

A modified embodiment is shown in FIG. 3 and reference numerals used with regard to the first embodiment have been used when possible to indicate like parts. Said second embodiment includes a housing, having a through cylinder 2. At the free end portions of the cylinder 2, two end pieces 3, 4 are attached against the housing. A piston member 7 is movably arranged in the cylinder 2, and grooves 5, 5' with a communicating channel 6 are arranged as previously described, said grooves 5, 5' and channel 6 establishing flow communication between the ends of the cylinder 2 and the respective ends of the piston member 7. An end piece 3 is arranged with an inlet 13, intended to faciliate connection with a pipe 14 (schematically illustrated) having a gaseous or liquid medium under pressure. The surface of the piston member 7 directed away from the inlet 13 is attached to a piston rod 8, slidingly extending through the adjacent end piece 4, having its free end portion arranged in contact with a lever 10, which lever 10 is pivotably attached at 20' at its end portion to the end piece 4. The part of the lever 10 extending from the attachment point 20', is arranged with a counterweight 11 movable in longitudinal direction along the lever, arranged with a locking member 12 as previously described, to faciliate fixation of the counter weight 11 in a desired position to the lever 10.

In this embodiment, use is made of the reduction in piston area produced by the piston rod 8, in order to achieve the desired difference in piston area relationship. The piston surface, to which the piston rod 8 is attached, is reduced by an area corresponding to the cross-sectional area of the piston rod 8 in relation to the opposite piston surface of the piston member 7, and when a pressure P is supplied, the resulting force $P_{res}$ can be calculated as follows, the cross-sectional area of the piston member being A and the cross-sectional area of the piston rod 8 being denominated a:

$$P_{res}=(P\times A)-(P\times(A-a))$$

The desired resulting force can be achieved by variation of the cross-sectional area for the cylinder 2 and/or the cross-sectional area of the piston rod 8.

Means such as outlet channels or similar relief means are not shown, but obviously, an outlet channel can be arranged from the cylinder 2, and the outlet channel can be arranged to be opened by means of the piston member 7 when the piston member 7 moves a predetermined amount from the inlet 13, caused by the fact that the pressure of the supplied medium exceeds a pre-set limiting value. Other variations are also possible, e.g. by transforming the movement of the lever 10 to an indicating member, intended to faciliate pressure indication, such as a pointer with a metering dial. The movement of the lever 10 can also be transferred to a separate valve member, such as shown schematically at 19 e.g. for discharge of a medium from the connected pipe, or for controlling a valve member having a different function, e.g. an interrupting valve, a flow reducing valve, or other valve.

As shown in FIG. 3, a relief valve 19 can be mechanically connected by a member 24 to lever 10 so that movement of lever 10 controls the flow through the valve in lines 25 and 26. Line 25 can be connected to pipe 14 and line 26 can be a return line or exhaust to the atmosphere. Predetermined movement of lever 10 can thereby be used to relieve the pressure in pipe 14.

Figure 4:
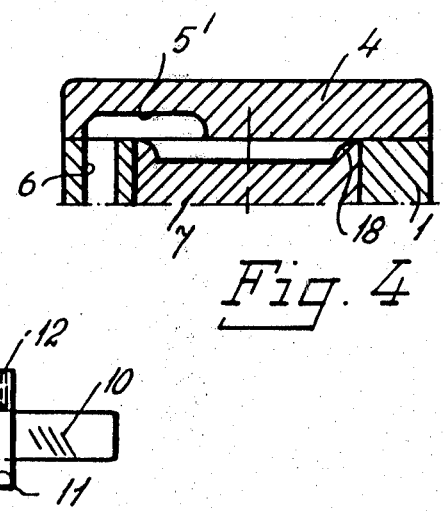
FIG. 4 is a cross-sectional view of a first embodiment of a contact member arranged at a piston surface, which surface is intended to be exposed to the pressure of the gaseous or liquid medium.

It should be noted, that it is not desired that the piston member 7, 7' can take up a contact position with an adjacent end piece 3, 4, since supplied medium then would only act against a restricted piston surface. However, this problem can easily be avoided by arranging an abutment means 18, which prevents the piston member 7, 7' from direct contact against an end piece 3, 4. An example of such an abutment member is shown in FIG. 4 and includes a peripheral flange 18 directed from the piston member 7 towards the adjacent end piece 4, which flange can be manufactured by a simple turning operation.

An alternative embodiment is shown in FIG. 5, in which the abutment member 18 comprises an annular member centrally located at the piston member 7, in the shown embodiment arranged surrounding piston rod 8. Many other embodiments are obviously also possible, including abutment means 18 extending from the end pieces 3, 4 in a direction towards adjacent piston surfaces.

FIG. 6 shows a third embodiment of a device for utilization of the method according to the present invention, having a different type of flow communication between the separated piston surfaces and also two separate piston members 7, 7', having similar cross-sectional areas. The difference in piston area is achieved in a manner similar to the above described second embodiment, i.e. by means of a piston rod 8, having a cross-sectional area which reduces the effective piston area of piston 7' from which the piston rod 8 extends.

The third embodiment of a device according to the present invention includes a housing 1, in which a through cylinder 2 is arranged, having two end pieces 3, 4 attached at each end portion of the cylinder 2. Two piston members 7, 7' are arranged in the cylinder 2 at a distance from each other attached to each other by means of a piston rod 8, extending through one of the pistons 7' out through adjacent end piece 4. The opposed end piece 3 is, as described with reference to the second embodiment, arranged with an inlet 13. From the piston surface adjacent to the inlet 13, a channel 17 extends through the piston rod 8 in the longitudinal direction of same, said channel leading to a point adjacent to the piston surface which is adjacent to the end piece 4, through which the piston rod 8 extends. The free end portion of the piston rod 8 is as described with reference to the second embodiment, arranged in contact with a lever 10, which lever 10 is pivotably attached to the end piece 4.

The inlet 13 is connected as previously described to a pipe having a gaseous or liquid medium under pressure whereby said medium flows into the part of the cylinder 2 located between the first piston member 7 and the end piece 3, in which the inlet 13 is arranged. The medium is also supplied via the channel 17 and hole 27 to the space existing between the second piston member 7' and the second end piece 4. The force applied in the direction towards the lever 10 is thus the product of supplied pressure multiplied with the effective area of the first piston member 7, and this area includes the area formed by the bottom surface of the channel 17, which extends through the piston rod 8. As described with reference to the second embodiment, the effective area which is made subject to a pressure in opposed direction becomes smaller, i.e. reduced by the area of the piston rod 8. Desired force transformation is thus achieved, since the force from the piston rod 8 acting on the lever 10 is a proportionally reduced force in relation to the pressure of the supplied medium. By application of a relatively small force to the piston rod 8, it is thus possible to move the piston rod 8, as well as the piston members 7, 7' in relation to the surrounding housing 1.

Shown and described embodiments are only intended to serve as examples of embodiments within the scope of the method according to the present invention. As shown, the embodiments can include one or a number of piston members, and different ways are also offered to achieve desired differences in area between the piston surfaces which are made subject to the pressure from a gaseous or liquid medium. The method in which the resulting force from the piston rod is used, can also be varied within wide limits, and the movement of the piston member/members can also be used, since they can act as slide valves, which can make the existing medium communicate with one or a number of outlets. As previously mentioned, the movement of the lever 10 can also be used for visual indication of existing medium pressure, by using the movement of the lever for indication of pressure. Recalibration to another pressure range is easily carried out by movement of the counterweight 11, or by replacement of same.

The present invention is thus in no way restricted to shown and described embodiments, which only serve as examples intended to simplify the understanding of the method and as examples of embodiments.

It should also be emphasized, that shown and described embodiments use at least one piston, movably arranged in a surrounding cylinder, but the method according to the present invention obviously also includes opposed pressure surfaces formed at a flexible membrane, which membrane is arranged in a surrounding housing, necessary area reduction being achieved at one surface of the membrane by for example a piston rod attached to one side of the membrane and extending out from the surrounding housing, in which case the area of the piston rod causes the difference between effective areas for the membrane. By using a membrane instead of piston members, friction losses caused by movement of a piston member are reduced to a minimum.

I claim:

1. Device for indicating fluid pressure in a fluid pressure system comprising a housing, at least one cylinder within said housing, at least one piston means linearly movable in said cylinder, said piston means having at least two pressure surfaces facing in opposite directions with respect to each other, a fluid medium under pressure communicating with said pressure surfaces, one of said pressure surfaces having a smaller effective area in relation to the other pressure surface, and means pivotally attached to said housing arranged to impose an added mechanical load to the force produced by said fluid pressure on the smaller pressure surface, the sum of said load and force being arranged as a limiting value which equals the force produced by said fluid pressure on the larger piston area at a predetermined pressure to prevent linear movement of said piston means, said mechanical load being operatively arranged to indicate movement of said piston means in response to a change in said pressure.

2. Device according to claim 1, wherein said piston means comprises two piston members attached to each other, one piston member having a cross-sectional area exceeding the other piston member flow channels in said housing to cause flow communication between the portions of the cylinder which are in communication with the said pressure surfaces and an inlet channel arranged to supply said fluid under pressure through said flow channels to said cylinder portions.

3. Device according to claim 2 wherein the housing has a substantially semi-circular groove, into which groove the inlet channel extends, and a co-acting member is provided having a mainly corresponding semi-circular groove, said co-acting member being arranged attachable against the housing for holding and embracing a pipe in said semi-circular grooves, said pipe being arranged to communicate with the inlet channel by means of a through hole in a peripheral wall portion of the pipe.

4. A device according to claim 2 and further comprising two coaxial spaced cylinders in said housing, one of each of said pistons being operably disposed in each cylinder, a piston rod attached to both pistons, a slot in said housing between said cylinders, said piston rod passing through said slot, and said means pivotably attached to said housing comprises a lever pivotably attached at one end to said housing within said slot, a slot in said lever, a pin member extending through said piston rod and slidably engaging in said slot in said lever so that movement of said pistons operate said lever about its pivotal attachment to said housing, and an adjustable weight on said lever adjacent the other end thereof to adjust the force on the pistons through said pin and slot connection between the lever and piston rod.

5. Device according to claim 1, wherein said piston means comprises a piston member having a uniform cross-sectional area, a piston rod extending from one pressure surface, thus reducing the effective pressure area for said one pressure surface, channels in said housing arranged to cause flow communication between cylinder portions communicating with said pressure surfaces and an inlet channel arranged to supply said fluid under pressure to said cylinder portions communicating with each other.

6. Device according to any one of claims 1, 2, or 5, wherein said mechanical load means comprises a lever pivotably attached to said housing extending in a direction from said housing, a counterweight attached adjustably to the lever, said lever and counterweight being arranged so that the total force of the mechanical load and the smaller pressure surface function as a predetermined limiting value for said fluid pressure, whereby only a pressure exceeding said limiting value causes a linear movement in direction towards the smaller pressure surface of said piston means.

7. Device according to claim 1 or 2, wherein an outlet channel is provided extending from the outer surface of the housing and communicating with a portion of the cylinder which is adjacent to the larger pressure surface when the piston means has moved to the limit of its travel.

8. Device according to claim 1 wherein said mechanical load means comprises a lever means pivotably attached to said housing extending in a direction from said housing, a counterweight attached adjustably to said lever means, said lever means and counterweight being arranged so that the total force of the mechanical load and the smaller pressure surface function as a predetermined limiting value for said fluid pressure, whereby only a pressure exceeding said limiting value causes a linear movement in the direction towards the smaller pressure surface of said piston means, said lever means controlling a flow adjusting valve member for said fluid pressure system in response to said linear movement of said piston means.

9. A method for indicating fluid pressure in a fluid pressure system comprising applying fluid under pressure against two oppositely facing pressure surfaces which have different active pressure areas, connecting said surfaces together so that the resultant forces on said surfaces oppose each other, applying a further adjustable force by an adjustable mechanical load in the direction of the force produced by said fluid pressure on the smaller of said pressure surfaces, adjusting said adjustable mechanical load so that the sum of said further force and the force on said smaller pressure surface equals the force on the larger pressure surface to balance the opposing forces at a predetermined operating pressure of the fluid system, whereby a change in said predetermined operating pressure will displace said pressure surfaces and the position of said adjustable mechanical load, and indicating said change in pressure by said change in position of said mechanical load.

10. A method according to claim 9 wherein the mechanical load is applied by means of a lever mechanism to a piston rod attached to at least one of the pressure surfaces and further comprising adjusting said fluid pressure in response to said change in position of the mechanical load.

11. Method according to any one of claims 9 or 10, wherein the pressure surfaces have a similar configuration, and the reduction in area for the smaller pressure surface is achieved by arranging a piston rod extending therefrom, thereby reducing the effective pressure area by the area of the piston rod.

* * * * *